W. C. SCHNEIDER.
TRANSMISSION GEARING.
APPLICATION FILED OCT. 17, 1910.
1,044,582.
Patented Nov. 19, 1912.
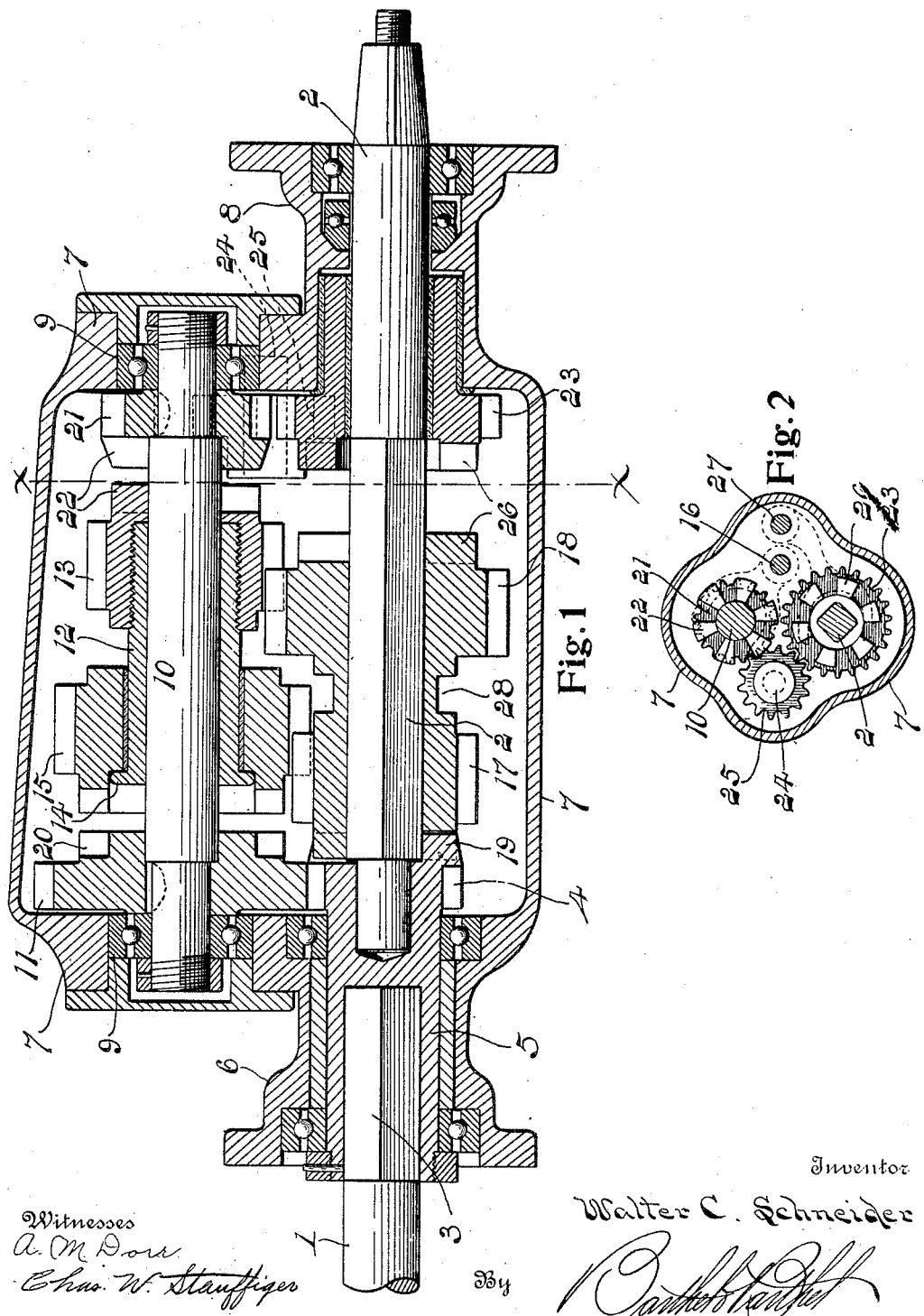

UNITED STATES PATENT OFFICE.

WALTER C. SCHNEIDER, OF DETROIT, MICHIGAN, ASSIGNOR OF ONE-THIRD TO OLIVER G. MOEBS, OF DETROIT, MICHIGAN.

TRANSMISSION-GEARING.

1,044,582.  Specification of Letters Patent.  Patented Nov. 19, 1912.

Application filed October 17, 1910. Serial No. 587,593.

*To all whom it may concern:*

Be it known that I, WALTER C. SCHNEIDER, a citizen of the United States of America, residing at Detroit, in the county of Wayne and State of Michigan, have invented certain new and useful Improvements in Transmission-Gearing, of which the following is a specification, reference being had therein to the accompanying drawings.

This invention relates to variable-speed power transmitting gearing of the sliding gear type and its object is to provide a simple, cheap and compact construction in which the parts are so arranged that the shifting gears are always in mesh with their coöperating gears, and further to provide certain other new and useful features in the construction and arrangement of parts, all as hereinafter more fully described, reference being had to the accompanying drawing in which—

Figure 1 is a longitudinal vertical section through a device embodying the invention; and Fig. 2 is a transverse section of the same substantially on the line $x$—$x$ of Fig. 1 and drawn to a reduced scale.

Transmitting mechanisms of this type have usually been arranged so that the gears when shifted to change the speed or direction of motion, are moved into and out of mesh with their coöperating gears, and thus in operation, when one set of gears is thrown longitudinally into mesh with the other, there is liability of stripping the teeth, the teeth are quickly worn out by the constant disengagement and reëngagement of the same, and the bringing of the teeth together always causes a disagreeable grinding noise. In applicant's construction, the shifting gears are in constant mesh with their coöperating gears and thus the noise and liability of stripping the teeth is obviated.

As shown in the drawing, 1 is the driving shaft and 2 a driven shaft arranged in axial alinement therewith, the driving shaft being provided with a squared inner end 3 upon which is sleeved a gear 4 having an extended hub portion 5 fitting the squared end of the shaft to turn therewith. Said hub 5 extends outward through a suitable bearing hub 6 on one end of a casing 7 and the driven shaft extends in an opposite direction through a bearing hub 8 at the opposite end of the casing. Mounted in the casing in suitable bearings 9, is a countershaft 10 extending parallel with the driving and driven shafts. Secured upon the counter shaft is a gear 11 in mesh with the gear 4 on the driving shaft, and free to rotate and slide longitudinally upon the counter shaft, is a sleeve 12 having formed integral therewith or otherwise secured thereto a gear 13 at one end and at its end adjacent to the gear 11 is provided with a flange or collar 14. A gear 15 of larger diameter than the gear 13 is mounted upon the sleeve 12 between the gear 13 and flange 14 to turn freely upon the sleeve, and adapted to be moved longitudinally of the countershaft when the sleeve is moved by means of any suitable lever or fork indicated in dotted lines in Fig. 2, which is interposed between said gears 15 and 13 and is secured to a longitudinally movable operating shaft 16.

Mounted upon the driven shaft 2 within the casing are gears 17 and 18 which are preferably formed of one piece or may be otherwise connected to turn together. These gears are free to slide longitudinally upon the driven shaft which is squared or otherwise formed to permit of such movement and to cause the gears and shaft to turn together. These gears are so proportioned and arranged that they are in constant mesh with the gears 13 and 15 on the counter shaft to transmit motion from the counter shaft to the driven shaft, said gears being of different relative diameters so that motion will be transmitted through the gears 15 and 17 to turn the driven shaft at a higher rate of speed than through the gears 13 and 18.

Clutch members or projections 19 are formed upon the inner end of the gear 4 to engage and mesh with similar ribs or projections on the adjacent end of the gear 17. When the gear 17 is moved longitudinally on its shaft toward the gear 4 these interlocking members 19 will be brought into engagement and the driving shaft will thus be directly connected to the driven shaft to transmit motion thereto at the full speed of the driving shaft.

Upon the inner end of the hub of the gear 11 are formed clutch members 20 to engage and interlock with similar members upon the adjacent end of the hub of the gear 15. When the sleeve 12 and gear 15 mounted thereon are moved toward the gear 11 the clutch members 20 will be brought into locking position, and the gear 17 being moved away from the gear 4 to disengage the clutch 19, motion will be transmitted from the driving shaft through the gears 4 and 11 and the clutch 20 to the gear 15 which is free to turn upon its sleeve 12 and is in mesh with the gear 17 to transmit motion through said gear to the driven shaft at a reduced speed.

Secured upon the counter shaft at its end opposite to that upon which the gear 11 is secured, is a gear 21 and this gear is formed with clutch members 22 on its inner end to engage similar members on the end of the hub of the gear 13. The clutch 19 being moved out of operative position to disengage the driven from the driving shaft, the sleeve 12 may be moved longitudinally toward the gear 21 to bring the clutch 22 into operation and connect the gear 13 with the counter shaft to turn therewith. Motion is then transmitted from the driving shaft to the counter shaft through the gears 4 and 11 and from said countershaft through the clutch 22 and gear 13 to the gear 18 which is in mesh therewith and is secured to the driven shaft to turn said shaft at a reduced speed, said gears 13 and 18 being proportioned to transmit a lower speed than the gears 15 and 17.

Sleeved upon the driven shaft to turn freely thereon is a gear 23 which is located directly opposite the gear 21 on the countershaft, and journaled upon a stub shaft 24 on the end of the casing is an intermediate gear 25 in constant mesh with both of the gears 21 and 23. The gear 23 is formed on the inner end of its hub with clutch members 26 to engage and interlock with similar members formed upon the adjacent end of the hub of the gear 18. When the gear 18 is moved longitudinally of the driven shaft to bring its clutch members into engagement with the clutch members on the gear 23 and the sleeve 12 is in mid position as shown in Fig. 1, motion will be transmitted from the driving to the counter-shaft through the gears 4 and 11 thence through the gear 21 and intermediate gear 24 to the loose gear 23, and said gear being connected by the clutch 26 with the gear 18, motion will be transmitted from said gear 23 to turn the driven shaft in a direction opposite to that in which the driving shaft is being turned. The gears 17 and 18 are shifted longitudinally upon the driven shaft by means of a forked lever secured upon an operating shaft 27 mounted in the casing said lever engaging a groove 28 in the hub portion connecting said gears.

In this construction gears having a wide face may be used without the necessity for making the casing of extreme length as the shifting gears do not move out of engagement with each other and only sufficient movement of the gears to disengage the clutches is necessary. The construction is therefore strong and compact and ease of operation is insured by the use of clutches which are more quickly and easily thrown into mesh with less noise and liability of breakage than where the teeth of the gears are thrown into and out of engagement by a longitudinal movement.

What I claim is:

1. A transmission gearing comprising parallel shafts, a driving member at one end of one shaft connected thereto to turn the same, reversing gearing connecting the shafts, a pair of gears on the shaft to which the driving member is secured, said gears being independently rotatable upon the shaft and connected to move together longitudinally of the shaft, a clutch for connecting said driving member with one of the gears, a clutch for connecting the other gear with the shaft, a pair of gears on the other shaft in constant engagement with the independently rotatable gears, said pair of gears being operatively connected to their shaft to turn therewith and secured together to move longitudinally upon the shaft, a clutch for connecting one of the gears of the last named pair to the reversing gears, and means for moving each pair of gears upon their shafts to bring the clutches into operative engagement.

2. A transmission gearing comprising a driving member, a driven shaft in axial alinement with the driving member, gears on the driven shaft operatively connected thereto to turn therewith and slidable longitudinally thereon, clutch members on the driving member to engage clutch members on the adjacent end of one of the gears on the driven shaft when said gear is moved toward the driving member, a gear fixed on the driving member, a counter shaft, a gear fixed on the counter shaft in mesh with the gear on the driving member, a gear fixed on the end of the counter shaft opposite that upon which the other gear is secured, a gear on the driven shaft to turn freely thereon, an intermediate gear between the loose gear on the driven shaft and the fixed gear on the counter shaft, means on the loose gear to engage interlocking members on the adjacent end of the adjacent longitudinally movable gear on the driven shaft, gears on the counter shaft free to move longitudinally thereon and to turn independently of each other, clutch members on said longitudinally movable gears to engage the fixed gears on the counter shaft when said gears are moved longitudinally into engagement with said fixed gears, and means for moving the longitudinally movable gears on each shaft.

3. A transmission gearing comprising a driving member, a driven shaft in axial alinement with said member, a counter shaft, a gear fixed on the driving member, a gear fixed on one end of the counter shaft in mesh with the gear on the driving member, connected gears on the driven shaft operatively connected thereto to turn therewith and to slide longitudinally thereon, clutch members on the opposite ends of said gears, clutch members on the driving member to engage the clutch members on one of the gears on the driven member when said gears are moved toward the driving member, a sleeve on the counter shaft to turn freely thereon and to slide longitudinally thereof, a gear on the sleeve to move longitudinally therewith and free to turn thereon, clutch members on said gear, opposed clutch members on the fixed gear on the counter shaft to engage the clutch members on said gear, a gear fixed on said sleeve having clutch members at one end, a fixed gear on the counter shaft at its end opposite to that upon which the other fixed gear is secured, clutch members on said fixed gear to engage the clutch members on the gear secured to the sleeve, a gear on the driven shaft free to turn thereon and provided with clutch members to engage the clutch members on the adjacent end of the longitudinally movable gear on the driven shaft, a gear in constant engagement with the loose gear on the driven shaft and the fixed gear on the counter shaft, and means for shifting the longitudinally movable gears on the said shafts.

In testimony whereof I affix my signature in presence of two witnesses.

WALTER C. SCHNEIDER.

Witnesses:
LEWIS E. FLANDERS,
ANNA M. DORR.